United States Patent [19]

Gallagher et al.

[11] Patent Number: 5,709,309
[45] Date of Patent: Jan. 20, 1998

[54] ORIFICE DRAIN STOP

[75] Inventors: Stephen W. Gallagher, Birmingham; David S. Snyder, Canton, both of Mich.

[73] Assignee: Ford Global Technologies, Inc., Dearborn, Mich.

[21] Appl. No.: 609,413

[22] Filed: Mar. 1, 1996

Related U.S. Application Data

[63] Continuation of Ser. No. 335,013, Nov. 7, 1994, abandoned.

[51] Int. Cl.⁶ .................................................. B65D 51/00
[52] U.S. Cl. .................... 220/229; 215/355; 220/DIG. 19; 137/849; 296/208; 296/408
[58] Field of Search ........................... 296/208, 408; 137/849; 220/229, DIG. 19, 307, 233, 789; 215/320, 354, 355

[56] References Cited

U.S. PATENT DOCUMENTS

| | | | |
|---|---|---|---|
| 2,897,835 | 8/1959 | Philippe | 137/849 X |
| 3,122,156 | 2/1964 | Kersh | 137/849 X |
| 3,199,457 | 8/1965 | Smart | 137/849 X |
| 3,701,560 | 10/1972 | Emmerson . | |
| 4,176,877 | 12/1979 | Schulz et al. . | |
| 4,262,701 | 4/1981 | Beacom . | |
| 4,700,981 | 10/1987 | Seyler . | |
| 4,762,308 | 8/1988 | Geno | 137/849 X |

FOREIGN PATENT DOCUMENTS

| | | |
|---|---|---|
| 1942761 | 6/1969 | Germany . |
| 1118816 | 10/1965 | United Kingdom . |

*Primary Examiner*—Allan N. Shoap
*Assistant Examiner*—Robin A. Hylton
*Attorney, Agent, or Firm*—David B. Kelley

[57] ABSTRACT

A sound attenuating drain stop for an orifice in an automotive floor pan has a resilient plug portion disposed in the orifice and a drainage bore extending axially therethrough, an annular groove for receiving the body panel so as to secure the plug portion thereto, and a compliant element completely obstructing the bore and selectively unobstructing cross-sectional areas of the bore in response to weight variation of fluid thereabove. The compliant element has a resilient, three-legged bridge member spanning the bore and deflectable under the weight of a first predetermined quantity of fluid to drain fluid above the element, and three pie-shaped flexible flaps defined by the bridge member and extending from an interior surface of the bore to the bridge member, the flexible flaps deflectable under the weight of a second predetermined quantity of water when the bridge member is undeflected.

13 Claims, 2 Drawing Sheets

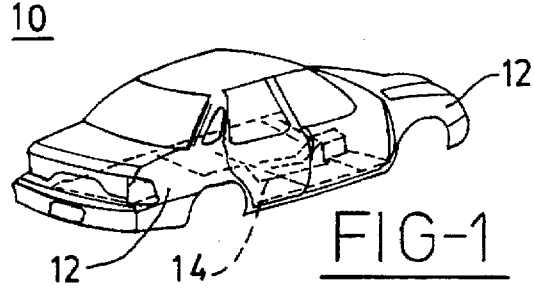
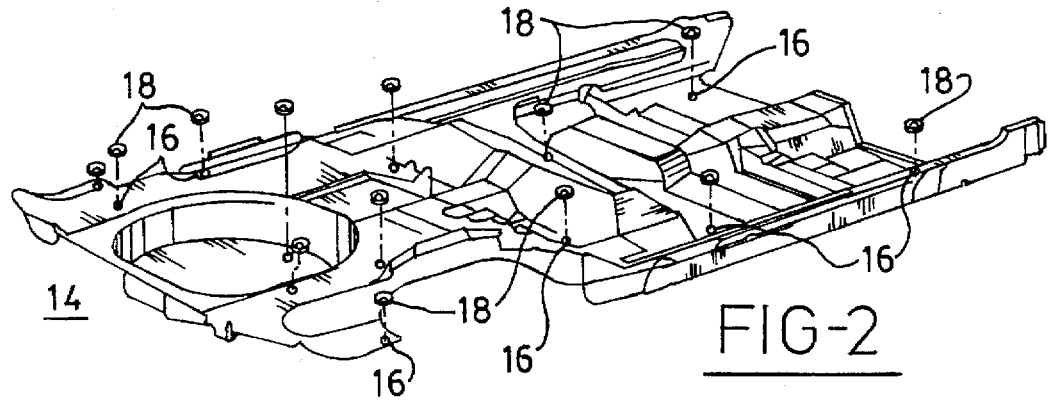
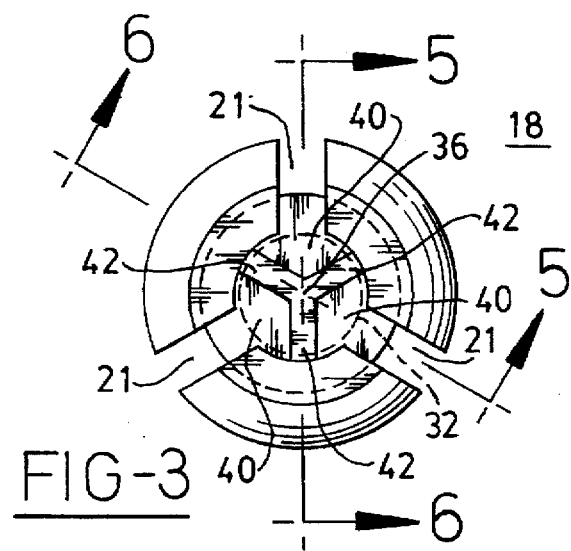
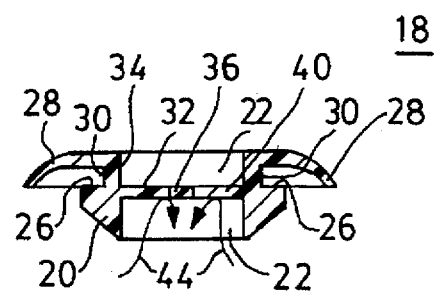
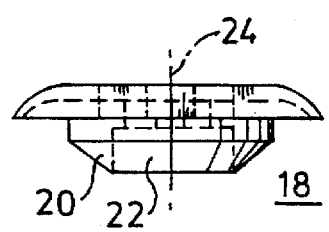

ORIFICE DRAIN STOP

This is a continuation of application Ser. No. 08/335,013 filed Nov. 7, 1994, now abandoned.

FIELD OF THE INVENTION

The present invention relates generally to automotive drain hole stops, and more particularly to a sound attenuating orifice drain stop which provides dual flow rate drainage through a drain hole to decrease vehicle Noise, Vibration, and Harshness characteristics.

BACKGROUND OF THE INVENTION

An automotive vehicle body is typically constructed of a number of sheet metal panels including door panels, rocker panels, front and rear quarter panels, and a floor pan or underbody. When these and other panels are combined, usually by welding, to form the vehicle body, a number of voids may exist between adjoining panels. For example, a door may have an inner panel and an outer panel with a space therebetween for a window, a window operating mechanism, a door lock, and the like.

Water from rain, washing, dew, or other sources may collect in the spaces between panels, or may seep through the body and accumulate in troughs or other low lying areas on the floor pan. In any case, such pooling of water potentially subjects the vehicle body to corrosion which decreases the overall aesthetic quality of the vehicle and may cause structural damage, particularly in unitized body constructions.

One known method of preventing the above described problem is to provide drain holes in those areas where water collects. Such holes could allow dust and dirt into the vehicle body spaces possibly holding moisture and hastening corrosion. In addition, the drain holes are a possible source of noise which degrades the noise, vibration and harshness (NVH) characteristics of the vehicle.

To address the aforementioned problem, some drain stops allow water drainage from the vehicle while attempting to prevent dust from entering the vehicle using flexible flaps, such as that disclosed in U.S. Pat. No. 3,701,560 (Emmerson). Those drain stops, however, have flexible flaps which sag with time as there is no structure across the center of the plug to support the flaps. In addition, no provision is made to attenuate noise resulting from air passing through the drain stop so as to reduce the NVH characteristics of the drain hole.

SUMMARY OF THE INVENTION

Responsive to the deficiencies in the related art, the present invention provides a new and improved drain stop for selective sound attenuation and drainage through orifice in an automotive body panel having an upper surface and a lower surface. The drain stop has a plug portion disposed in the orifice with a drainage bore extending axially therethrough. The plug portion is secured to the body panel with retaining means, for example an annular ledge on the plug portion in abutment with one of the lower surface and the upper surface, and an annular shoulder of greater perimeter size than the orifice extending from the plug in abutment with the other of the lower surface and the upper surface so as to retain the stop to the body panel.

Sound attenuation and drainage means for selectively obstructing the drainage bore is comprised of a resilient bridge member which spans the bore and defines a plurality of drainage ports. The drainage ports are obstructable by a plurality of flexible flaps extending from an interior surface of the bore to the bridge member. Sound attenuation is accomplished in conjunction with fluid drainage. In a first position with no fluid or an insignificant amount on the drain stop, the bridge member and the flaps are undeflected so as to attenuate sound impinging thereupon and so obstruct airflow therethrough. When a minimal predetermined amount of water or other fluid accumulates on the drain stop, the bridge member deflects downward to drain an area above the stop while the plurality of flexible flaps remain undeflected, thus providing some degree of noise control. When a considerable amount of fluid collects above the drain stop, the plurality of flexible flaps deflect to drain the area above the stop while the bridge member remains undeflected.

Accordingly, an advantage of the present invention is a drain stop which simultaneously provides sound attenuation and dual drainage paths.

Another advantage is a drain stop with flexible flaps which resist sagging over time.

According to another advantage, a drain stop obstructs air flow through a drainage orifice resulting in improved NVH characteristics.

According to still yet another advantage, a drain stop having sound attenuation and dual drainage flow rates can be easily manufactured and assembled on an economical basis.

According to one feature of the present invention, a drain stop has a bridge section spanning the drainage bore and a number of flexible flaps which seat adjacent the bridge section.

According to another feature, the drain stop has flexible flaps which deflect under a predetermined weight of fluid, and a bridge member which deflects under a lesser predetermined weight of fluid to provide dual flow rate drainage.

According to yet another feature of the present invention, flexible flaps in a drain stop need not extend across the entire drainage bore thus being shorter in length to reduce sag and allow greater drainage control.

BRIEF DESCRIPTION OF THE DRAWINGS

These and other advantages and features of the present invention will be apparent to those skilled in the automotive body arts upon reading the following description with reference to the accompanying drawing, in which:

FIG. 1 is a perspective view of an automotive body structure;

FIG. 2 is a perspective view of an automotive underbody with drain orifices having drain stops according to a preferred embodiment of the present invention in one-to-one relation;

FIG. 3 is a top view of a sound attenuating drain stop according to a preferred embodiment of the present invention;

FIG. 4 is a side view of the sound attenuating drain stop shown in FIG. 3;

FIG. 5 is a sectional view taken along line 5—5 of FIG. 3 showing a bridge member and flexible flap members in a closed position;

DETAILED DESCRIPTION OF THE PREFERRED EMBODIMENTS

Figure 6:
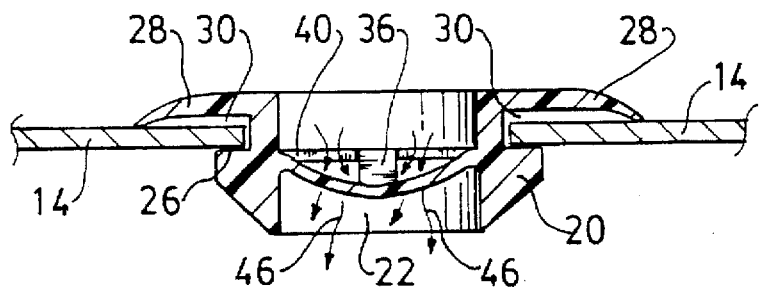
FIG. 6 is a sectional view taken along line 6—6 of FIG. 3 showing a bridge member deflected to allow drainage therethrough while flexible flap members remain in a closed position.

Referring now to the drawings, and first to FIGS. 1 and 2, a vehicle body 10 is shown comprised of a number of panels 12, including an underbody, or floor pan 14. A number of drain orifices 16 penetrate through floor pan 14 at various locations, as better seen in FIG. 2, to drain water or other fluids which seep through the panels 12, for example from rain. Those skilled in the art will recognize that drain orifices 16 may also be placed within panels 12 for drainage of moisture accumulated thereon. Drain stops 18, discussed in more detail below, are placed in orifices 16 to prevent dust or dirt from entering while also providing drainage of moisture and sound attenuation of noise.

A preferred embodiment of a drain stop 18 according to the present invention is shown in FIGS. 3–6A. As seen in FIGS. 4 and 5, drain stop 18 has a plug portion 20 with a drainage bore 22 extending therethrough along axis 24. The plug portion 20 has a perimeter generally larger than the perimeter of an orifice 16, but is made of resilient material which compresses when fitted through orifice 16 (FIG. 6) and expands to its original shape after passing therethrough. An annular ledge 26 on plug portion 20 receives floor pan 14 thereon, and an annular shoulder 28 having greater perimeter size than the perimeter size of orifice 16 extends radially outward from an upper section of the plug portion 20. Taken together, ledge 26 and shoulder 28 define an annular groove 30 (FIGS. 5 and 6) for receiving floor pan 14.

Shoulder 28 prevents drain stop 18 from passing completely through orifice 16 and, together with ledge 26, serves to retain drain stop 18 to floor pan 14. The perimeter size of shoulder 28 is preferably greater than the perimeter size of plug portion 20 to better assist in retaining drain stop 18 to floor pan 14. Three notches 21 in shoulder 28 allow fluid flow from an upper surface 14' of floor pan 14 to bore 22 (FIGS. 5 and 6).

As best seen in FIGS. 3 and 5, drain stop 18 has a sound attenuation and drainage element 32 extending completely across drainage bore 22, from an inner surface 34, to selectively obstruct same as further discussed herein. Element 32 is comprised of a resilient bridge member 36 which spans bore 22 thus defining a number of drainage ports 38 (FIG. 6A), and three flexible flaps 40, which along with bridge member 36 selectively attenuate sound and drain fluid through drainage ports 38. Preferably, bridge member 36 is comprised of three spaced-apart legs 42 extending from inner surface 34 and connecting approximately in the center of bore 22, thus defining three pie-shaped drainage ports 38. Legs 40 are preferably approximately 120° apart, but can be spaced apart at other, non-equal angles to permit varying flap 40 sizes which open under different circumstances to allow desired flow rates.

In addition to defining drainage ports 38, bridge member 36 serves as a seat for flaps 40. Flaps in prior drain stops seat against one another without adequate support, thus leading to sag over time. Flaps 40 of the present invention seat against legs 42 of bridge member 36 which provide a more stable surface than adjoining flaps, thus decreasing flap sag and prolonging the usefulness of the drain stop 18.

Figure 6A:
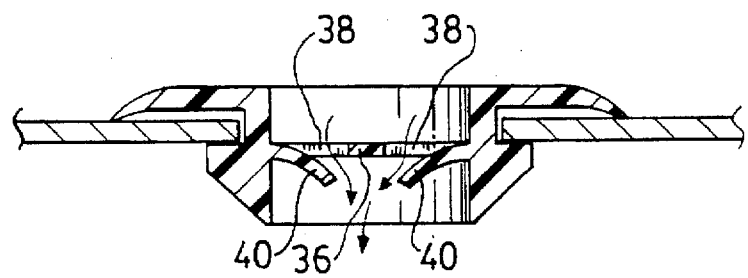
FIG. 6A is a sectional view similar to FIG. 6 but showing a bridge member in an undeflected position while the flexible flap members are deflected to an open position to allow drainage through the plug.

In a preferred embodiment, element 32 can take at least three positions to effectuate sound attenuation and drainage. As seen in FIG. 5, element 32 has a first position in which minimal or no fluid is above element 32 with bridge member 36 and flaps 40 are undeflected so as to attenuate sound impinging thereupon and to obstruct airflow therethrough, as indicated by arrows 44. When a first predetermined quantity of fluid accumulates above element 32, bridge member 36 deflects under the weight of the fluid, as depicted by arrows 46 in FIG. 6, to allow drainage through bore 22 while flaps 40 remain undeflected. Thus, fluid can drain past bridge member 36 while sound is simultaneously attenuated by flaps 40. When a second predetermined quantity of fluid accumulates above element 32, flaps 40 deflect under the weight of fluid to drain the area above element 32, as seen in FIG. 6A, while the bridge member remains undeflected. The fluid is thus drained past flaps 40 while sound is simultaneously attenuated by bridge member 36.

The flaps have sufficient strength and stiffness to remain undeflected in a cantilevered state for short periods of time while the first (smaller) predetermined quantity of water passes through the bore 22. It will readily be seen, as in FIG. 6, that the circumferential length attaching the bridge member 36 to the bore 22 is less than the circumferential length of the flaps 40. Less fluid is therefore required to initially deflect the bridge member 36 than the flaps 40. Thus, upon the bridge member 36 deflecting, fluid will leak past the element in the bore 22 which in turn decreases the pressure thereabove so that that flaps 40 remain undeflected. However, when a larger quantity of fluid collects above the element sufficient to deflect the flaps 40, only they will deflect for a significant period of time to allow the fluid therethrough. The opening of the flaps 40 decreases the pressure on the element 32 so that the bridge member 36 remains undeflected. The flow of fluid past the flaps 40 retains them in a deflected state until the fluid has drained.

The first and second predetermined amounts of fluid which cause deflection of bridge member 36 and flaps 40, respectively, depend upon several factors, including size of bore 22, thickness of element 32, material comprising element 32, and the ratio of bridge member 36 area to flaps 40 area. In the embodiment shown in FIG. 3, for example, the total area of bridge member 36 is less than the total area of flaps 40. If the material and thickness of element 32 is uniform, bridge member 36 will deflect under the weight of a first predetermined quantity of fluid which is less than a second predetermined quantity of fluid needed to deflect flaps 40. Thus, when a small amount of fluid accumulates above element 32, bridge member 36 will deflect to drain it. However, when a larger quantity of fluid collects above element 32, for example during a rain downpour or when vehicle 10 passes through a carwash, flaps 40 deflect downward to drain the fluid through bore 22.

Figure 7:
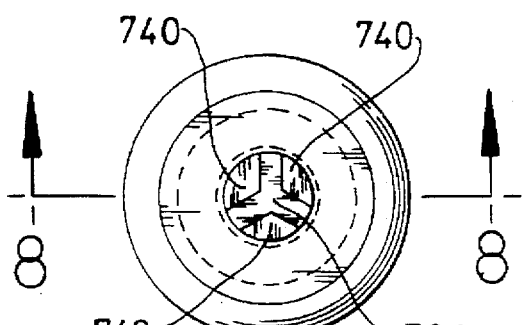
FIG. 7 is a top view of a sound attenuating drain stop according to an alternative embodiment of the present invention.
Figure 8:
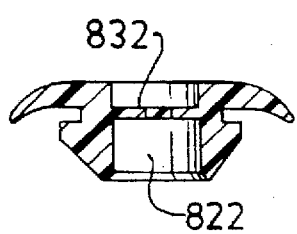
FIG. 8 is a side view of the sound attenuating drain stop shown in FIG. 7.

In the alternative embodiment shown in FIGS. 7 and 8, bridge member 736 has a greater total area than that of flaps 740. Bore 822 also has a smaller diameter. Thus, assuming as before that the material and thickness of element 832 is uniform, bridge member 736 and flaps 740 will deflect under opposite conditions as those described for the embodiment of FIG. 3 previously described. That is, when a small amount of fluid accumulates above element 832, flaps 740 deflect downward to drain the fluid through bore 822. However, when a larger quantity of fluid collects above element 832, bridge member 736 deflects to drain it.

Figure 9:
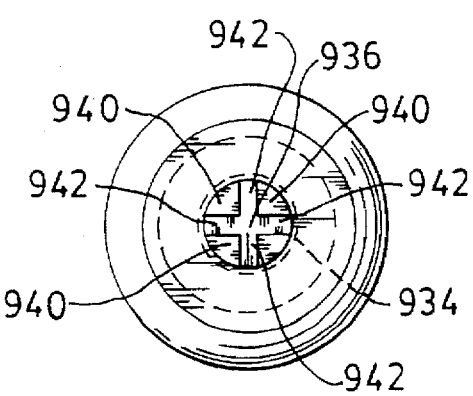
FIG. 9 is a top view of a sound attenuating drain stop according to a second alternative embodiment of the present invention.

Those skilled in the art will recognize that the geometric shape of a bridge member is not limited to that shown in FIGS. 3 and 7. For example, as shown in FIG. 9, a cross-shaped bridge member 936 has four spaced-apart legs 942 extending from interior surface 934 thus defining four flexible flaps 940 which selectively attenuate sound and drain fluid through drain stop 918 in a manner similar to that described above for drain stop 18 of FIGS. 3–6A. Other shapes for bridge member 936 are also acceptable which will provide the advantageous dual rate drainage and sound attenuation properties herein disclosed.

It is also to be understood that plug portion 20, bore 22, and shoulder 28, need not necessarily be circular in shape but can be square, rectangular, or other shapes as required by drain hole 16 location in floor pan 14.

To achieve the simplicity in assembly and the economy in manufacture necessary for competitiveness in large scale production environments, such as the automotive industry, drain stop 18 can be made from a single material. That is, plug shoulder 28, bridge member 36, flaps 40, and plug portion 20 can comprise an integral piece made from a durable, resilient material, such as rubber.

Construction of a drain stop as herein described allows fluid drainage from an automotive body to vary according to quantity of water to be drained while simultaneously attenuating sound by selectively obstructing a portion of a bore in the drain stop during draining.

Although the preferred embodiments of the present invention have been disclosed, various changes and modifications may be made without departing from the scope of the invention as set forth in the appended claims.

We claim:

1. A drain stop for an orifice in an automotive body panel having an upper surface and a lower surface, the stop comprising:

a plug portion disposed in said orifice and having a drainage bore extending axially therethrough;

retaining means for securing said plug portion to said body panel; and means for selectively obstructing and draining said bore, means for selectively obstructing and draining comprised of a resilient bridge member spanning said bore and defining a plurality of drainage ports obstructable by a plurality of flexible flaps extending from an interior surface of said bore to said bridge member.

2. A drain stop as defined in claim 1 wherein said bridge member is cross-shaped with four spaced-apart legs extending from said interior surface and wherein four flexible flaps selectively attenuate sound and drain fluid through four drainage ports defined by said bridge member.

3. A drain stop as defined in claim 1 wherein said plug portion has a perimeter greater than the perimeter of said orifice and wherein said retaining means comprises an annular groove of perimeter size approximately equal to the perimeter size of said orifice formed in said plug portion for receiving said body panel.

4. A drain stop as defined in claim 1 wherein said plug portion, said retaining means, said bridge member, and said flexible flaps comprise an integral piece made from rubber.

5. A drain stop as defined in claim 1 wherein said bridge member is comprised of three spaced-apart legs extending from said interior surface and wherein three flexible flaps selectively attenuate sound and drain fluid through three drainage ports defined by said bridge member.

6. A drain stop as defined in claim 5 wherein said retaining means comprises an annular ledge on said plug portion in abutment with one of said lower surface and said upper surface, and an annular shoulder of greater perimeter size than said orifice extending from said plug in abutment with the other of said lower surface and said upper surface so as to retain said stop to said body panel.

7. A drain stop as defined in claim 6 wherein said shoulder has at least one notch therein for allowing fluid on said upper surface to flow therefrom to said bore.

8. A drain stop for an orifice in an automotive body panel having an upper surface and a lower surface, the stop comprising:

a plug portion disposed in the orifice and having a drainage bore extending axially therethrough;

retaining means for securing the plug portion to the body panel; and means for alternatively opening and closing cross-sectional areas of the bore in response to fluid thereabove, the means for alternatively opening and closing comprised of:

(a) a resilient bridge member spanning the bore and defining a plurality of drainage ports; and (b) a plurality of flexible flaps extending from an interior surface of the bore to the bridge member to obstruct the plurality of drainage ports.

9. A drain stop as defined in claim 8 wherein the bridge member is comprised of three spaced-apart legs extending from the interior surface and wherein three flexible flaps selectively attenuate sound and drain fluid through three drainage ports defined by the bridge member.

10. A drain stop as defined in claim 9 wherein the retaining means comprises an annular ledge on the plug portion in abutment with one of the lower surface and the upper surface, and an annular shoulder of greater perimeter size than the orifice extending from the plug in abutment with the other of the lower surface and the upper surface, the ledge and the shoulder taken together defining an annular groove for receiving the body panel so as to retain the stop thereto.

11. A drain stop as defined in claim 10 wherein the plug portion, the retaining means, the bridge member, and the flexible flaps comprise an integral piece made from rubber.

12. A drain stop for an orifice in an automotive body panel having an upper surface and a lower surface, the stop comprising:

(1) a resilient plug portion disposed in the orifice and having a drainage bore extending axially therethrough;

(2) an annular groove for receiving the body panel so as to secure the plug portion thereto; and (3) a compliant element completely obstructing the bore and selectively unobstructing cross-sectional areas of the bore in response to fluid thereabove, the element having:

(a) a resilient, three-legged bridge member spanning the bore; and (b) three pie-shaped flexible flaps defined by the bridge member and extending from an interior surface of the bore to the bridge member.

13. A drain stop as defined in claim 12 wherein the plug portion, the retaining means, and the compliant element comprise an integral piece made from rubber.

* * * * *